United States Patent [19]

Giuffrida et al.

[11] Patent Number: 4,956,071
[45] Date of Patent: Sep. 11, 1990

[54] ELECTRODEIONIZATION APPARATUS AND MODULE

[75] Inventors: Anthony J. Giuffrida, N. Andover; Gary C. Ganzi, Lexington; Yoram Oren, Brookline, all of Mass.

[73] Assignee: Millipore Corporation, Bedford, Mass.

[21] Appl. No.: 298,455

[22] Filed: Jan. 18, 1989

Related U.S. Application Data

[60] Continuation-in-part of Ser. No. 908,913, Sep. 18, 1986, which is a division of Ser. No. 762,804, Aug. 2, 1985, Pat. No. 4,632,745, which is a continuation of Ser. No. 628,930, Jul. 9, 1984, abandoned.

[51] Int. Cl.$^5$ ............................................. B01D 13/02
[52] U.S. Cl. .................................. 204/301; 204/182.4; 204/182.5
[58] Field of Search .................... 204/301, 182.4, 182.5

[56] References Cited

U.S. PATENT DOCUMENTS

| | | | |
|---|---|---|---|
| 3,291,713 | 12/1966 | Parsi | 204/301 |
| 3,341,441 | 9/1967 | Giuffrida et al. | 204/182.4 |
| 4,632,745 | 12/1986 | Giuffrida et al. | 204/301 |
| 4,747,929 | 5/1980 | Siu et al. | 204/301 |
| 4,804,451 | 2/1989 | Palmer | 204/182.5 |

Primary Examiner—John F. Niebling
Assistant Examiner—Arun S. Phasge
Attorney, Agent, or Firm—Andrew T. Karnakis; Paul J. Cook

[57] ABSTRACT

An electrodeionization apparatus and process are provided for removing ions from liquids. Liquid to be purified is passed through depleting compartments containing mixed anion and cation exchange resin beads while a second liquid is passed through concentrating compartments also containing ion exchange resin beads. Ions, under influence of a D.C. potential, pass from the depleting compartments into the concentrating compartments through ion permeable membranes. The beads in the depleting compartments are housed within subcompartments of controlled width and thickness and are retained therein by the ion permeable membranes which are secured to the walls of the subcompartments. Means are provided for reversing the polarity of the D.C. potential to convert the depleting compartments to concentrating compartments and the concentrating compartments to depleting compartments. Means are provided for continuously recovering purified water from the apparatus regardless of the polarity of the D.C. potential and the timing of the polarity reversal cycle.

14 Claims, 5 Drawing Sheets

ELECTRODEIONIZATION APPARATUS AND MODULE

"This application is a continuation-in-part of copending application Ser. No. 908,913, filed Sep. 18, 1986 which in turn is a divisional application of Ser. No. 762,804, filed Aug. 2, 1985, now U.S. Pat. No. 4,632,745 which, in turn is a continuation of application Ser. No. 628,930, now abandoned."

BACKGROUND OF THE INVENTION

This invention relates to a novel electrodeionization module adapted to transfer ions in a liquid under the influence of a polar field. More specifically, this invention relates to an electrodeionization apparatus adapted to purify aqueous liquids to effect the production of high purity water.

The purification of a liquid by reducing the concentration of ions or molecules in the liquid has been an area of substantial technological interest. Many techniques have been used to purify and isolate liquids or to obtain concentrated pools of specific ions or molecules from a liquid mixture.

The most well-known processes include distillation, electrodialysis, reverse osmosis, liquid chromatography, membrane filtration and ion exchange. A lesser known method is electrodeionization, occasionally mistermed filled cell electrodialysis.

The first apparatus and method for treating liquids by electrodeionization was described by Kollsman in U.S. Pat. Nos. 2,689,826 and 2,815,320. The first of these patents describes an apparatus and process for the removal of ions within a liquid mixture in a depleting chamber through a series of anionic and cationic diaphragms into a second volume of liquid in a concentrating chamber under the influence of an electrical potential which causes the preselected ions to travel in a predetermined direction. The volume of the liquid being treated is depleted of ions while the volume of the second liquid becomes enriched with the transfer ions and carries them in concentrated form. The second of these patents describes the use of macroporous beads formed of ion exchange resins as a filler material positioned between the anionic or cationic diaphragms. This ion exchange resin acts as a path for ion transfer and also serves as an increased conductivity bridge between the membranes for the movement of ions.

The term "electrodeionization" refers to the process wherein an ion exchange material is positioned between anion and cationic diaphragms. The term "electrodialysis" refers to such a process which does not utilize ion exchange resins between the anionic and cationic diaphragms. Illustrative of other prior art attempts to use the combination of electrodialysis and ion exchange materials or resins to purify saline from brackish are described in U.S. Pat. Nos. 2,794,770; 2,796,395; 2,947,688; 3,384,568; 2,923,674; 3,014,855 and 4,165,273. Attempts to improve electrodeionization apparatus are shown in U.S. Pat. Nos. 3,149,061; 3,291,713; 3,515,664; 3,562,139; 3,993,517 and 4,284,492.

A commercially successful electrodeionization apparatus and process is described in U.S. Pat. No. 4,632,745. The apparatus utilizes ion depleting compartments containing an ion exchange solid composition and a concentrating compartment which is free of ion exchange solid material. The electrodeionization apparatus includes two terminal electrode chambers containing an anode and a cathode respectively which are utilized to pass direct current transversely through the body of the apparatus containing a plurality of ion depleting compartments and ion concentrating compartments. In operation, the dissolved ionized salts of the liquid are transferred through the appropriate membranes from the ion depleting compartments to the ion concentrating compartments. The ions collected in the ion concentrating compartments are removed through discharge outlets and are directed to waste. One difficulty in utilizing electrodeionization apparatus is the deposit of insoluble scale within the cathode compartment primarily due to the presence of calcium, magnesium and bicarbonate ions in the liquid which contact the basic environment of the cathode compartment. Scaling can also occur in concentrating compartments under conditions of high water recovery. The scale comprises primarily alkaline earth metal carbonates and hydroxides which increase the electrical and hydrolytic resistance of the cathode an concentrating compartment and, as a result, lowers the efficiency of the apparatus.

It has been proposed in U.S. Pat. No. 3,341,441, in an electrodialysis process, to reverse periodically the direction of current flow in which case, the electrode once serving as the cathode becomes the anode and anode electrode becomes the cathode. The solution flowing through the anode chamber becomes acidic due to anodic electrolytic action, and the acid thus formed tends to dissolve a small portion of scale formed therein during the time the electrode was cathodic. In the process, the acid generated within the anode chamber is allowed to attain a sufficiently high concentration in the chamber so as to dissolve precipitated solid formed therein during the electrodes' previous cathodic cycle and thereafter, reversing the polarity of the direct current is performed at periodic intervals. In a preferred form of the process a third step is also employed comprising continuously flushing the cathode compartment with a sufficiently large volume of electrolyte solution to quickly remove any base generated therein. When the direct current is reversed, the ion depleting compartments become the ion concentrating compartments and the ion concentrating compartments become the ion depleting compartments. This process is undesirable since a large volume of liquid being purified must be discharged to waste in a time interval immediately following voltage polarity reversal since the concentration of electrolyte in the newly formed ion depleting compartments is too high for a period of time to render the purity of the liquid product acceptable. An additional disadvantage of this process is that in order to avoid scaling in the concentrating and cathode compartments, that the time between polarity reversal must be short, since the generation of hydroxide ion that occurs at the cathode and anion membranes in normal operation is unbuffered due to the lack of ion exchange resins in the compartments of the device.

Accordingly, it would be desirable to provide a means for preventing scale buildup in the electrode and concentrating compartments in an electrodeionization process while at the same time avoiding the loss of any liquid product which is being purified, and extending the time between reversal cycles as long as possible.

SUMMARY OF THE INVENTION

The present invention provides an apparatus capable of producing water of up to about 1.0 meg ohm cm quality or better while avoiding buildup of particulates, organics and scale within the apparatus. The apparatus includes a plurality of electrodeionization compartments comprising an odd number of ion permeable membranes to form at least one ion depleting compartment and at least one ion concentrating compartment each of which compartments contains a solid ion exchange composition (a "dual compartment"). Each of the compartments is divided into subcompartments by means of a spacer and ribs spaced apart from each other so that the subcompartments have a width defined by the distance between the ribs of between about 0.3 and 4 inches and a thickness of between about 0.05 and 0.25 inches. An ion permeable membrane is positioned between the compartments and at the opposing ends of the compartments and are bonded to the ribs and spacers so as to retain the solid ion exchange material within the subcompartments. In addition, the ion permeable membranes are positioned so that anion permeable membranes and cation permeable membranes alternate along the thickness of the electrodeionization apparatus. A plurality of dual compartments can be joined together in a manner such that adjacent dual compartments share a common ion permeable membrane to form the electrodeionization apparatus, or, neutral zones can be positioned between the dual compartments. During operation, the polarity of voltage applied to the electrodes is reversed in order to dissolve and desorb organics at the cathode, to oxidize deposits and dissolve any scale at the anode, to dissolve any scale from prior cycles in the newly formed depleting compartments and to desorb any adsorbed foulants that may be deposited during use of the apparatus in the newly formed concentrating compartments. As a result of voltage polarity reversal, the compartments which were initially ion depleting compartments become ion concentrating compartments and the initial ion concentrating compartments become ion depleting compartments. There is no need to direct product liquid to waste as a consequence of voltage polarity reversal since there is an unexpected rapid ion migration and ion depletion within the newly formed ion depleting compartments combined with a time delay in the increase of concentration in the newly formed concentrating compartments such that the product liquid never attains an unacceptably high concentration of ions. Also, the time between reversal cycles can be extended due to an unexpected time delay of any pH shifts in the concentrating and cathode streams thereby decreasing the scaling potential in the device.

DETAILED DESCRIPTION OF SPECIFIC EMBODIMENTS

Figure 1:
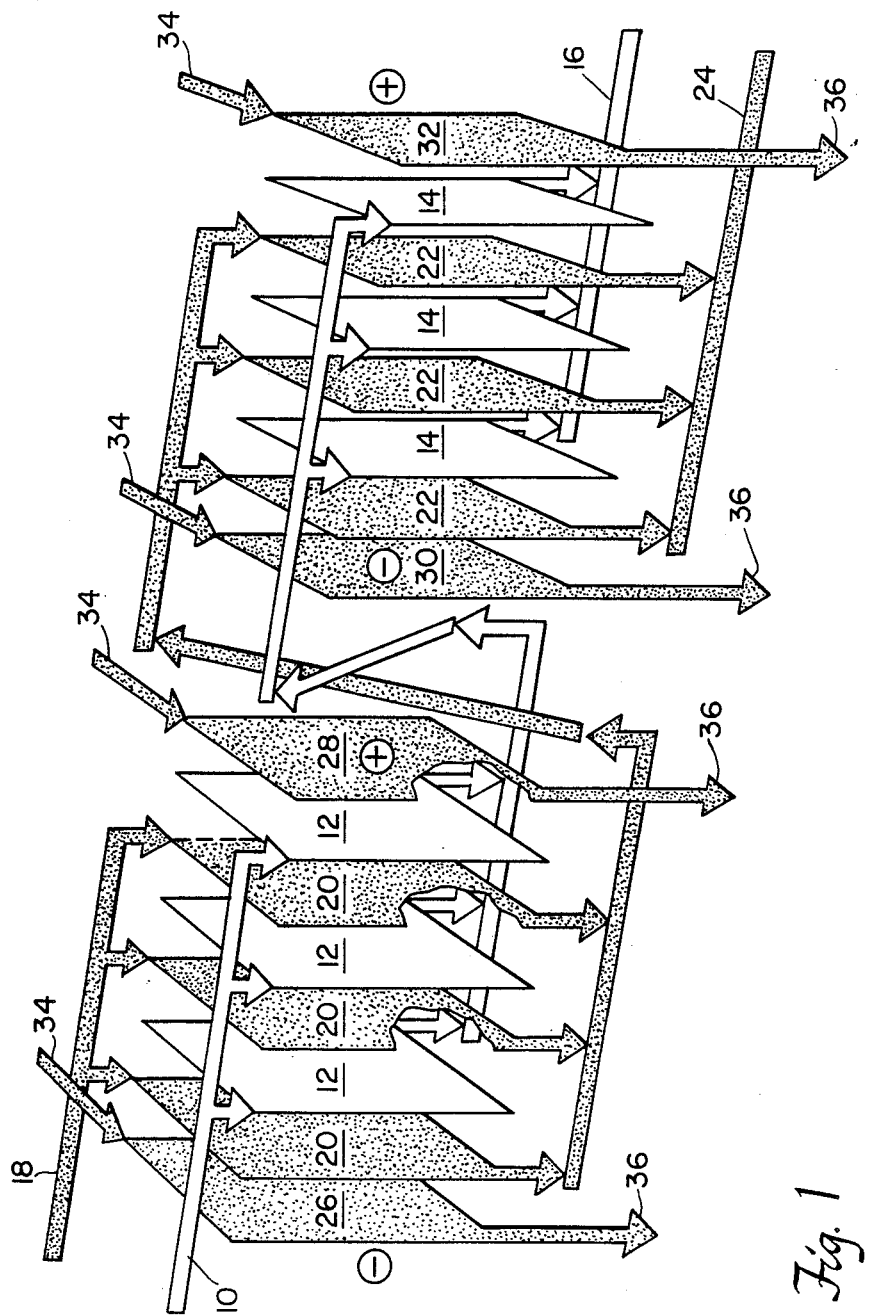
FIG. 1 is a schematic view illustrating the operation of the apparatus of this invention.

In accordance with this invention, an electrodeionization apparatus is provided wherein each electrodeionization stage includes an anode compartment, a cathode compartment, and a series of ion concentrating compartments which alternate with a series of ion depleting compartments. Each of the concentrating compartments and depleting compartments contains a solid ion exchange material such as a mixture of anion exchange resin and cation exchange resin. The concentrating and depleting compartments are formed so that the ion exchange resin mixtures are housed within independent discrete subcompartments each of which have a width of about 4 inches or less, preferably between 0.5 and about 1.5 inches. The discrete subcompartments are formed by securing, such as by bonding, both the anion permeable membrane and the cation permeable membrane to the periphery of the depleting and concentrating compartments and to ribs which extend across the thickness of and along the length of the concentrating and depleting compartments, thus, each subcompartment is defined by a pair of ribs, the anion permeable membrane and the cation permeable membrane.

As set forth herein, the term "dual compartment" means a compartment formed of an odd number of permeable membranes, at least one depleting compartment and at least one concentrating compartment, each of which compartments are divided into subcompartments, as described above. The ion permeable membranes are arranged so that the anion permeable membrane and the cation permeable membrane alternate along the thickness of the dual compartment. Thus, the dual compartment can include one more cation permeable membrane than anion permeable membrane or can include one more anion permeable membrane than cation permeable membrane of the odd number ion permeable membranes. It has been found in accordance with this invention that the dual compartment structure permits reversing voltage polarity in a manner which does not require directing a portion of the liquid product to waste due to the presence of the solid ion exchange material positioned within the subcompartments by the ribs and by the ion permeable membranes. Representative suitable solid ion exchange materials include fibers, woven fibers, beads or the like. When utilizing ion exchange beads, a typical bead diameter is about 0.04 inches or less and usually between about 0.033 and about 0.012 inches in diameter.

The electrodeionization apparatus can comprise one of a plurality of stages. In each stage, the anode is positioned at an opposite end of a stack of depleting and concentrating compartments from an end at which the cathode is positioned. Each anode and cathode is provided with an adjacent electrode spacer and an ion permeable membrane wherein an electrolyte passes through the electrode spacer. Optionally, the electrode spacer can be filled with ion exchange resin. The remaining portion of each stage comprises a series of alternating depleting and concentrating compartments constructed as set forth herein. The liquid to be depleted of ions can be passed in parallel through each depleting compartment in each stage and a second liquid can be passed through each concentrating compartments in parallel in each stage in order to effect removal of ions from the first liquid in the depleting compartment into the second liquid in the concentrating compartments. When a plurality of stages are utilized, the liquid removed from the depleting compartments in an upstream stage can be directed in series into the depleting compartments of the next adjacent downstream stage. Similarly, the liquid removed from the concentrating compartments of an upstream stage can be directed in series to the concentrating compartments in the next adjacent downstream stage. Electrolyte can be obtained from the feed, product, neutral, or concentrate streams or from an independent source and passed through the spacer adjacent to each electrode in the electrodeionization apparatus and is removed from the electrodeionization apparatus. Optionally, electrolyte from the spacer adjacent the electrode can be passed through one or more neutral zones or the concentrate stream prior to being directed to waste. In accordance with this invention, scale and organics build up within the electrodeionization apparatus, particularly at the electrodes, is prevented by periodically reversing the voltage polarity such that the original anode becomes a cathode and the original cathode becomes the anode. When voltage polarity is reversed, the original depleting compartments become concentrating compartments and concentrating compartments become depleting compartments. At the electrodes any accumulated scale is cleaned during the anodic cycle and any accumulated organics are dissolved during the cathodic cycle and are removed. Also any accumulated scale in the concentrating compartments is dissolved during the initial period of the diluting cycle and is rinsed to drain. In addition, any organic foulants accumulated during the diluting cycle are desorbed from the resin and membranes during the concentrating cycle by the action of increased salinity and removed in the waste stream so that their presence does not adversely affect the quality of the water or function of the equipment.

During voltage polarity reversal, it would be expected that a portion of the liquid recovered from the compartments would need be discarded since ion removal would not be sufficiently rapid during the polarity reversal. However, surprisingly, in accordance with this invention, the ion removal from the newly formed depleting compartments is sufficiently rapid and during the initial period after reversal there is a delay time between polarity reversal and deterioration of water quality in the newly formed concentrating stream so that the liquid product need not be discarded at any time during or between any cycle. In other words, the conductivity of the liquid product from either or both of the newly formed depleting or concentrating compartments are sufficiently low as to render the liquid product acceptable in one stream or the other stream or both. This result is very desirable since it eliminates the need for valving and conduit means for directing a portion of the liquid product from the newly formed depleting compartment to waste followed by a reversal of the system flow to effect recovery of the liquid product from the newly formed depleting compartments. Also since polarity reversal in accordance with this invention permits continuous recovery of high quality product, the prior art need for a holding tank system with associated pumping capacity is desirably eliminated.

In addition, it would be expected that the time between polarity reversal would be short, to prevent the immediate localized formation of scale on surfaces such as the cathode and anion membranes. However, surprisingly, in accordance with this invention, localized scaling is minimized by the pH buffering action of the ion-exchangers in the concentrating and/or electrode streams. Therefore the time between polarity reversal can be extended resulting in purer product on the average.

It is essential that the subcompartments in the depleting and concentrating compartments have a controlled thickness and width in order to sustain high efficiency of ion depletion over long periods. The thickness of the subcompartments should be about 0.05 and 0.25 inches, preferably, between about 0.06 and 0.125 inches. The width of the subcompartments should be between about 0.3 and about 4 inches, preferably between about 0.5 and about 1.5 inches. There is no limit on the length of the subcompartment other than as dictated by practical construction and fluid pressure loss considerations. The longer the subcompartment length, the greater the ion removal from the liquid therein. Generally, the length of the subcompartments is between about 5 inches and about 70 inches. The subcompartments can contain 100% anion or cation exchange material or a mixture of the two. When it is desired to remove only a particular anion or particular cation, 100% of the appropriate ion exchange material is used. Usually it is desired to remove both cations and anions in order to produce a purified liquid product. When utilizing strong acid-base resin materials such as beads, the ratio of anion exchange resin beads to cation exchange resin beads generally is about 60 to 40 percent by volume. By utilizing the subcompartment structure and the depleting and concentrating compartments, an efficient mixture of the liquid and the beads therein is obtained while avoiding channeling of the liquid through the depleting and concentrating compartments as well as avoiding compaction or movement of beads within a portion of the volume of depleting and concentrating compartments. Thus, an efficient interchange of the ions in the depleting and concentrating compartments with the ions in the beads to effect ion removal from the liquid in the depleting compartments is attained.

In one aspect of this invention, the product stream is directed to an apparatus having essentially the same physical structure as the apparatus of this invention but without means for polarity reversal to produce 10 megohm quality water or better. Polarity reversal in this downstream step is not necessary since the product water of this invention is highly pure.

This invention will now be described with reference to the accompanying drawings.

Referring to FIG. 1, liquid to be purified enters inlet 10 and passes through depleting compartments 12, through depleting compartments 14 and then is recovered from outlet 16. Concentrating liquid is passed through inlet 18, through concentrating compartments 20 and 22 thence through outlet 24 to drain. Liquid electrolyte is circulated through electrode compartments 26, 28, 30 and 32 from inlets 34 and is discarded to drain through outlets 36. When operated in the mode shown in FIG. 1, electrode compartments 26 and 30 comprise cathodes and electrode compartments 28 and 32 comprise anodes.

Figure 2:
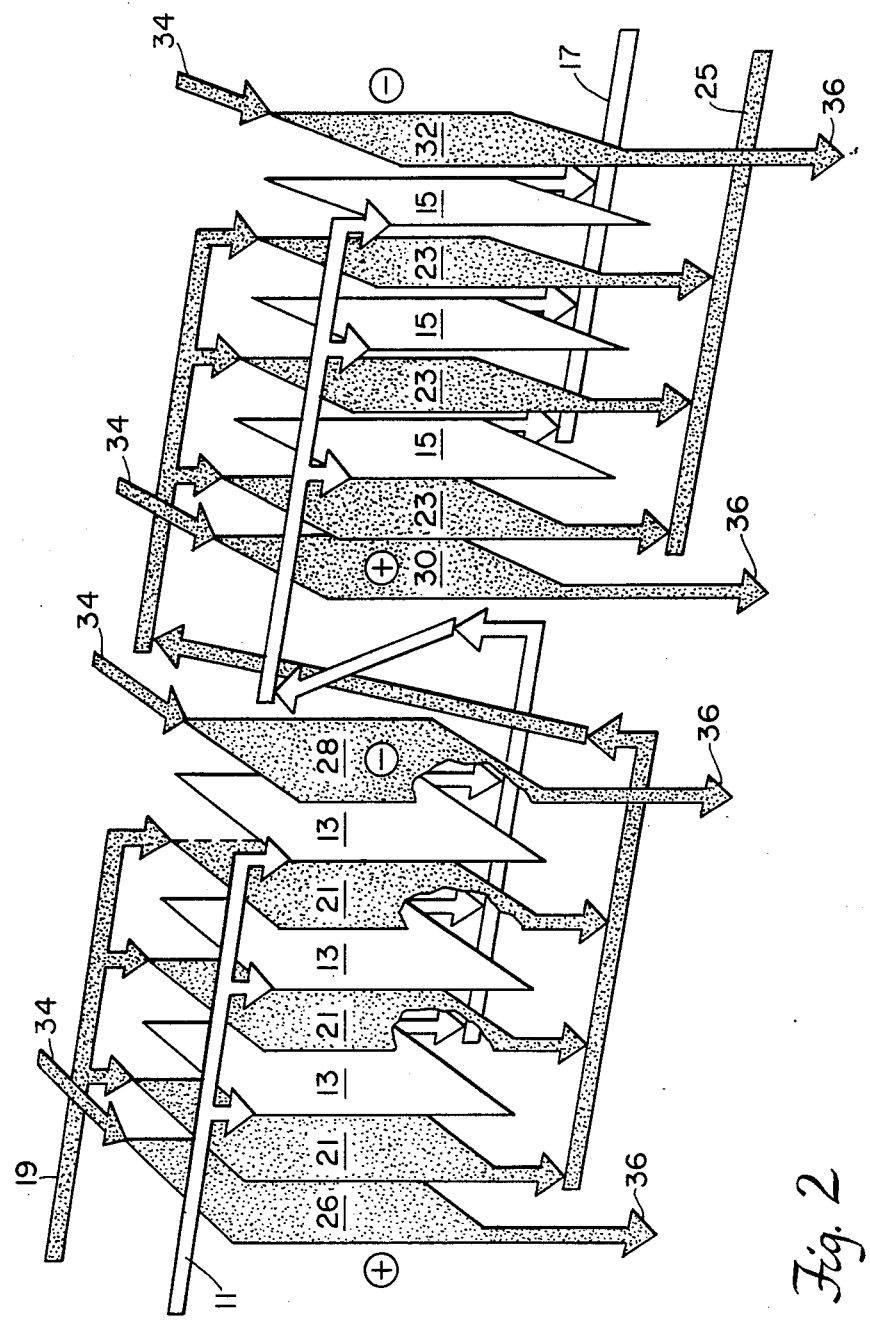
FIG. 2 is a schematic view illustrating the operation of the apparatus of this invention where the plurality of apparatus of FIG. 1 is reversed.

Referring to FIG. 2, the polarity of the electrodes is reversed such that electrodes 26 and 30 comprise anodes and electrodes 28 and 32 comprise cathodes where a liquid electrolyte is circulated therethrough from inlets 34 and is discarded to drain through outlets 36. Because of the polarity reversal, the depleting compartments 12 of FIG. 1 now become concentrating compartments 13 and the depleting compartments 14 of FIG. 1 become concentrating compartments 15. Similarly, the concentrating compartments 20 and 22 of FIG. 1 become depleting compartments of 21 and 23. Therefore, the product outlets 16 of FIG. 1 becomes a waste stream 17 while the waste stream 24 of FIG. 1 becomes a product stream 25.

Figure 3:
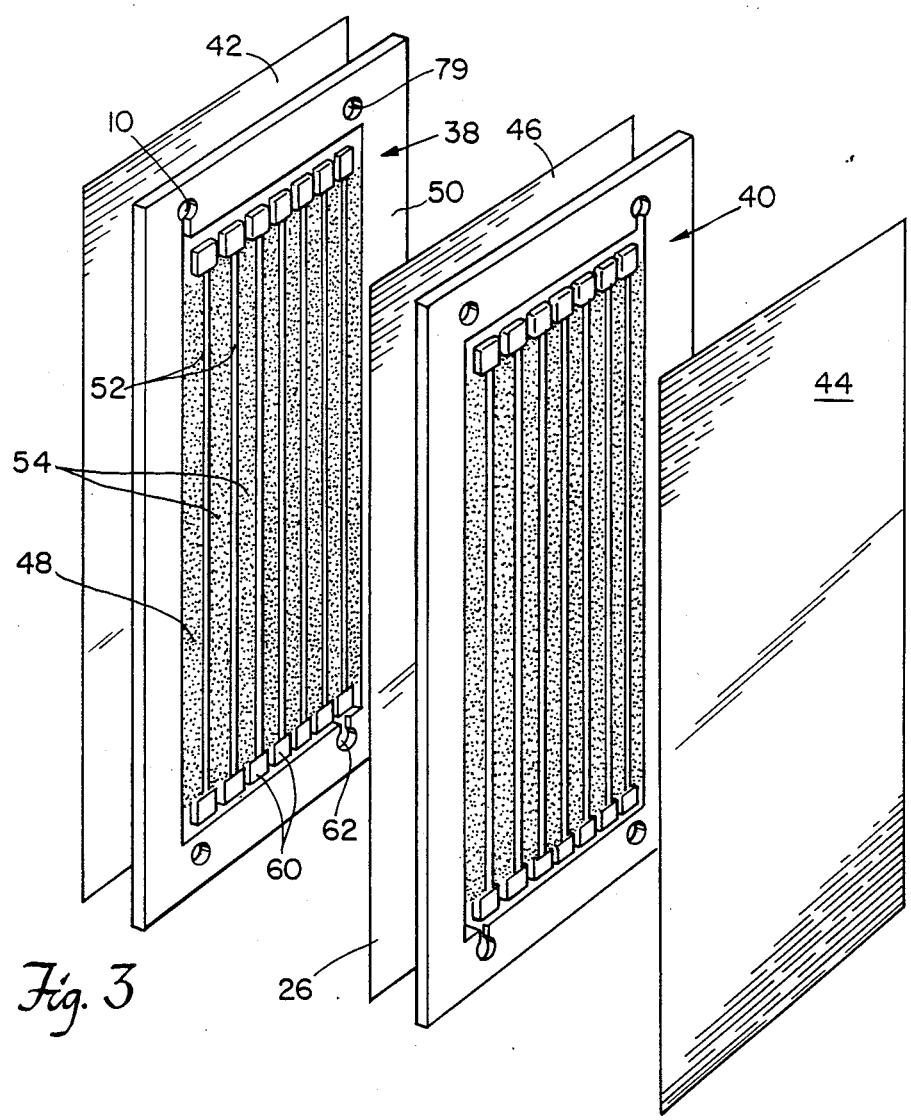
FIG. 3 is a pictorial view showing the dual compartment structure of this invention.
Figure 4:
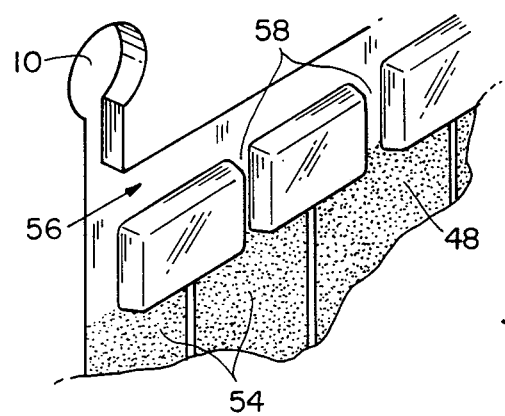
FIG. 4 is a detailed view of the liquid inlet to the structure of FIG. 3.

Referring to FIGS. 3 and 4, the structure of the dual compartments of this invention is shown in detail. The dual compartment comprises rigid spacers 38 and 40, cation permeable membranes 42 and 44 and anion permeable membrane 46. The ion exchange material 48 is housed within subcompartments formed by the membranes 42, 44 and 46, the walls 50 and ribs 52. The membranes 42, 44, and 46 are sealed along their entire length to walls 50 and ribs 52. The membranes 42, 44, and 46 all are also sealed to the periphery of the rigid spacers 38 and 40 so that the individual subcompartments 54 are effectively isolated from each other. Liquid to be purified enters inlet 10 passes along conduit 56 through inlets 58 and into the subcompartments 54 wherein they are subjected to an electrical voltage in order to pass cations through membranes 42 and 44 and anions through membrane 46. The purified liquid then passes through outlet 60 and spacer outlet 62 wherein it is collected in accordance with the description of FIGS. 1 and 2.

Figure 5:
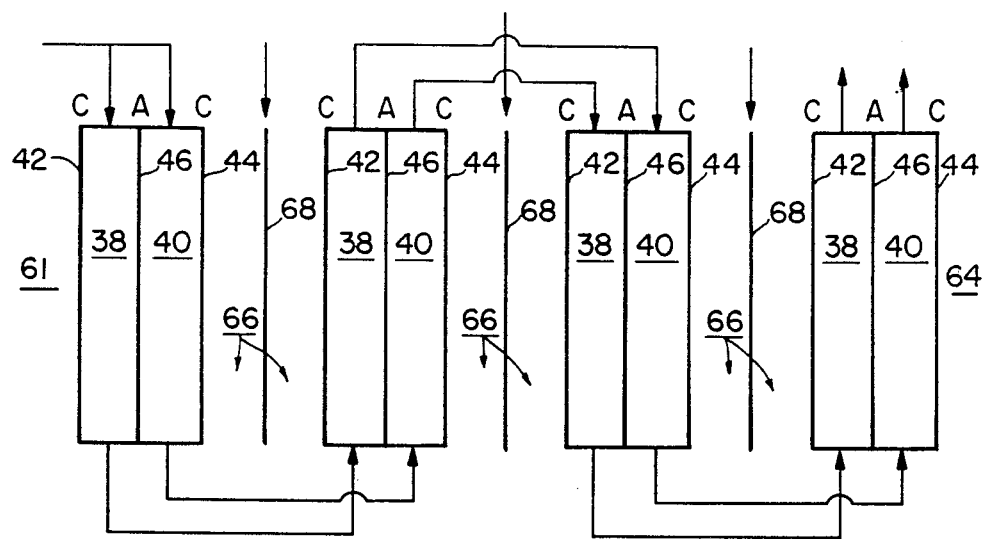
FIG. 5 is a schematic diagram showing the electrodeionization apparatus of this invention.

Referring to FIG. 5, an arrangement of dual compartments is shown each of which includes two cation permeable membranes 42 and 44 and anion permeable membrane 46 separated by and bonded to spacers 38 and 40 as set forth above. When the polarity of electrode 61 is negative, the compartment including spacer 38 is an ion depleting compartment while the compartment including spacer 40 is an ion concentrating compartment. When the polarity of electrode 61 is positive and the polarity of electrode 64 is negative, the compartments including spacer 38 become ion concentrating compartments and the compartments including spacer 40 comprise ion depleting compartments. The liquid for the depleting and concentrating compartments passing through 38 and 40 can be passed in series as shown in FIG. 5 or in parallel therethrough or combination of series and parallel flow. An optional construction is shown in FIG. 5 wherein the dual compartment structures are separated by neutral zones 66 which include screens 68. The neutral zones 66 merely function to prevent contact between membranes of adjacent dual compartments. The liquid for the neutral zones 66 can be passed in series or in parallel therethrough and can be fed by the feed stream, electrode streams, depleting or concentrating streams as desired and can be directed to waste or fed to the anode or cathode, depleting or concentrating compartments as desired prior to exiting the apparatus.

Figure 6:
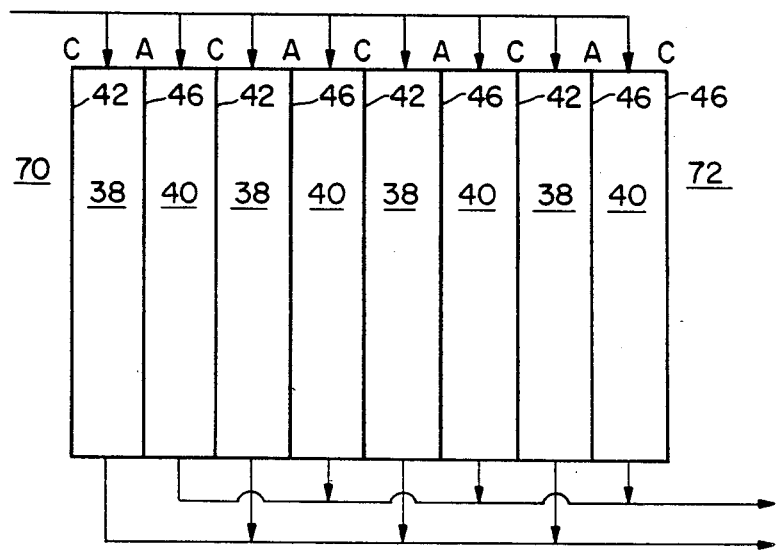
FIG. 6 is an alternate structure of the ion depleting and ion concentrating compartments of the invention.

Referring to FIG. 6, an alternative arrangement of dual compartments is shown which excludes the need for neutral zones as set forth in FIG. 5. When the polarity of electrode 70 is negative and the polarity of electrode 72 is positive, the compartments including spacer 38 function as ion depleting compartments and the compartments including spacer 40 function as ion concentrating compartments. When the polarity of electrode 70 is positive and the polarity of electrode 72 is negative, the compartments including spacer 38 become ion concentrating compartments and the compartments including spacer 40 become ion depleting compartments. Neutral zones of the type shown in FIG. 5 can be interposed, if desired, between dual compartments wherein each dual compartment concludes an odd number, e.g., 3, 5, 7, 9 etc. of ion permeable membranes with anion permeable membranes alternating in position with cation permeable membranes. In an additional optional construction ion exchange resin can be placed in electrode streams 26, 32, 61, 64, 70 and 72.

Any anion permeable membrane or cation permeable membrane having the strength to withstand the operating pressure differential, typically up to about 5 psi, can be utilized in the present invention. It should be pointed out that sealing of the membranes to the ribs forming the subcompartments permits the use of higher operating pressure and enhances the apparatus of the prior art since the assembly strength is thereby increased. Representative suitable ion permeable membranes include a homogeneous type web supported styrene-divinylbenzene based with sulfonic acid or quarternary ammonium functional groups sold under the identification as CR 61 CZL 386 and AR 103 QZL 386 by Ionics, Inc,; a heterogeneous type web supported using styrenedivinylbenzene based resins in a polyvinylidine difluoride binder sold under the identifications MC-3470 and MA-3475 by Sybron/Ionac; homogenous type web supported styrenedivinylbenzene based with sulfonic acid or quarternary ammonium functional groups sold under the name Aciplex by Asahi Chemical Industry Co., Ltd.

A process of this invention can be controlled by measuring a part of the conductivity for all or anyone of the stages and adjusting in the process parameters including process voltage, liquid flow voltage, temperatures, pressures and electrical current accordingly. Representative suitable process voltages are between about 1 and about 8 volts per dual compartment with a total voltage in the apparatus of up to about 600 volts or higher.

The following example illustrates the present invention and is not intended to limit the same.

EXAMPLE 1

Utilizing the arrangement depicted in FIG. 5, the process was operated under the following conditions: A four pass electrodeionization module as shown in FIG. 5 was used during this test. The feed flow to the depleting and concentrating compartments was approximately 0.2 l/min in each stream. The feed composition was approximately 100 ppm calcium, 50 ppm magnesium, 100 ppm sodium, 40 ppm bicarbonate, 120 ppm sulfate, and 90 ppm chloride, all as calcium carbonate. The feed conductivity was approximately 600 umhos with a Langelier Scaling Index (L.S.I.) of $-0.3$. The applied stack voltage was 20.8 volts with 0.78 amps. The product water out of the stack ranged from 2.1–0.7 microsiemens/cm whereas the concentrate was about 1200 microsiemens/cm. The depleting and concentrating quality data was collected starting at the reversal point or time zero and every 30 seconds for the first five minutes and every minute thereafter until reversal occurred again at approximately 15 minutes. Both the depleting cycle and concentrate cycle data was collected separately. A Myron-L (EP Meter) conductivity meter was used to obtain the data. Satisfactory results also were obtained with a 2 pass module.

Figure 7:
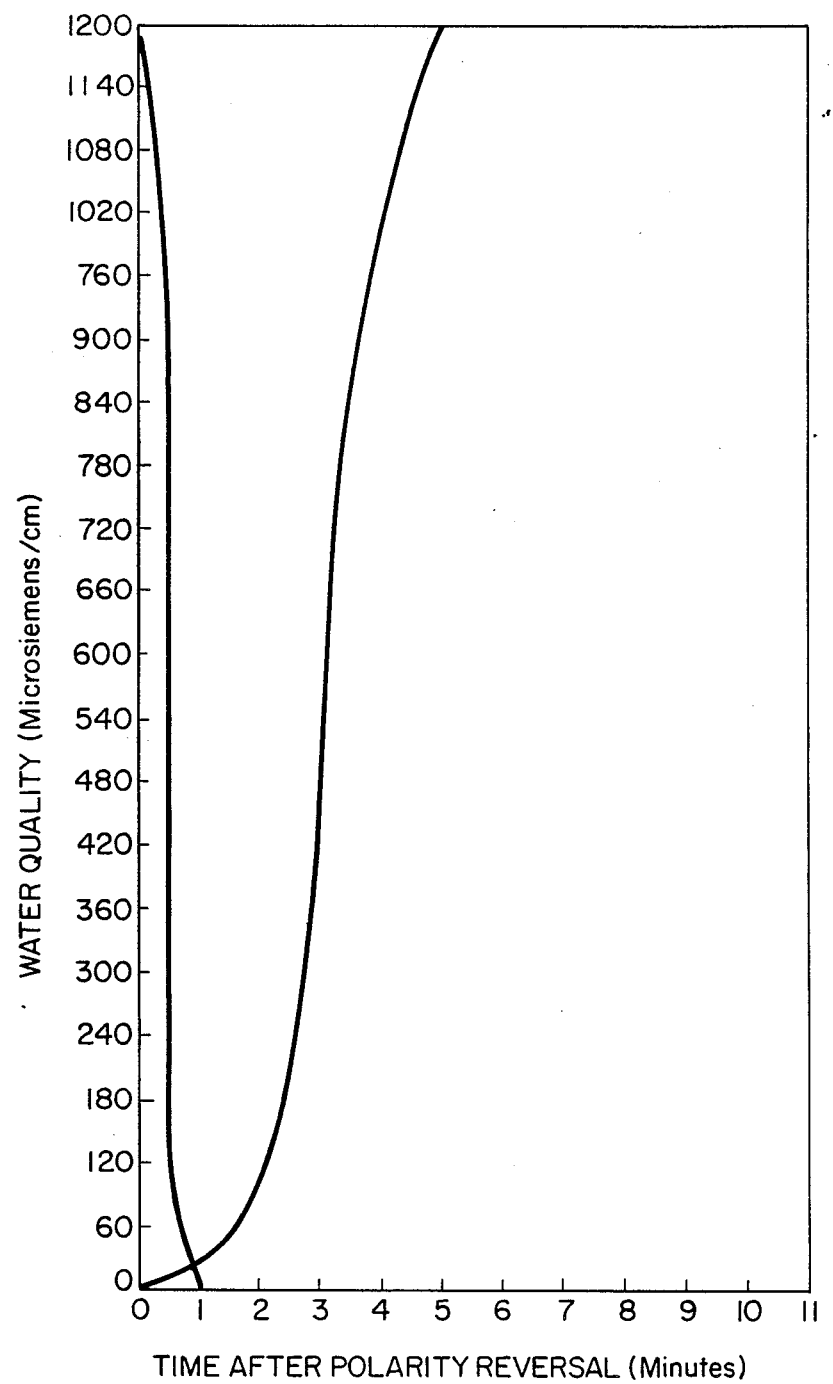
FIG. 7 shows the conductivity of water product and concentrate as a function of time after polarity reversal.

As shown in FIG. 7, at reversal of voltage polarity, the newly formed depleting stream changes from 1200 microsiemens/cm to 6–7 microsiemens/cm with a 600 microsiemens/cm feed water within 1 minute. The newly formed concentrate stream has enough hydrogen ion and hydroxyl ion capacity from electroregeneration in the previous cycle to continue to produce 1.5 to 15 umho water for about 30 seconds even though ions are being added to the cells. The 30 second additional production of high quality water in the newly formed concentrate cells makes it advantageous to delay hydraulic switching of the streams providing enough time for the newly formed diluting cells to recover to dilute operation. Delayed switching also avoids water waste and allows for continuous flow. Typical reversal cycles can be between about two minutes and two hours and more usually between about 10 and 40 minutes.

We claim:

1. Electrodeionization apparatus adapted to remove ions from a liquid which comprises:
    a first cathode compartment at a first end of said apparatus,
    a first anode compartment at an end of said apparatus that is opposite of said first end,
    a plurality of dual compartments comprising an ion depleting compartment, an ion concentrating compartment and an odd number of at least three ion permeable membranes,
    said ion permeable membranes comprising anion permeable membranes alternately positioned with respect to cation permeable membranes,
    each of said ion depleting compartments and each of said ion concentrating compartments comprising a spacer and a plurality of ion depleting subcompartments and ion concentrating subcompartments,
    said subcompartments being formed by a plurality of ribs extending along the length of each of said ion depleting compartments and said ion concentrating compartments,
    each of said ion depleting subcompartments and said ion concentrating subcompartments containing a mixture of anion exchange resin and cation exchange resin,
    each of said ion depleting subcompartments and said ion concentrating subcompartments having a width defined by the distance between said ribs of between about 0.3 and 4 inches and a thickness between about 0.05 and 0.25 inches wherein the thickness of said subcompartments is defined by the distance between an anion permeable membrane adjacently positioned to a cation permeable membrane, said membranes being bonded to each of said ribs, along the length of said ribs, and to said spacer,
    such that the anion permeable membrane and cation permeable membrane are positioned alternatively along the length of said dual compartment,
    means for passing a first liquid to be purified through said ion depleting compartments,
    means for passing a second liquid for accepting ions from said first liquid through said ion concentrating compartments,
    means for supplying an electrical voltage between an anode in said anode compartment and a cathode within said cathode compartment,
    means for reversing polarity of said electrical voltage to convert said anode to a second cathode and to convert said cathode to a second anode and to convert said ion depleting compartments to second ion concentrating compartments and to convert said ion concentrating compartments to second ion depleting compartments and,
    means for recovering a liquid product having low conductivity continuously from said ion depleting, compartments and said second ion depleting compartments.

2. The apparatus of claim 1 wherein said plurality of dual compartments are joined directly to each other and wherein adjacent dual compartments share a common ion permeable membrane.

3. The apparatus of claim 1 wherein at least a portion of said plurality of dual compartments are separated by neutral zones and means for passing a third liquid through each of said neutral zones.

4. The apparatus of claim 2 wherein said plurality of dual compartments are separated from each other by a neutral zone and means for passing a third liquid through each of said neutral zones.

5. The apparatus of claim 1 wherein the width of said subcompartments is between about 0.5 and 1.5 inches.

6. The apparatus of claim 1 wherein the thickness of said subcompartments is between about 0.06 and 0.125 inches.

7. The apparatus of any one of claims 1, 2, 3, 4, 5 or 6 wherein the volume ratio of anion exchange resin to cation exchange resin in said ion depleting compartments and in said ion concentrating compartments is between about 2.0 and 0.5.

8. The apparatus of any one of claims 1, 2, 3, 4, 5, and 6 wherein the anode compartment and the cathode compartments are filled with an ion exchange resin composition.

9. A dual compartment construction adapted to remove ions from a liquid which comprises: an ion depleting compartment, an ion concentrating compartment and an odd number of at least three ion permeable membranes
    said ion permeable membranes comprising anion permeable membranes alternately positioned with respect to cation permeable membranes,
    each of said ion depleting compartments and each of said ion concentrating compartments comprising a spacer and a plurality of ion depleting subcompartments and ion concentrating subcompartments,
    said subcompartments being formed by a plurality of ribs extending along the length of each of said ion depleting compartments and said ion concentrating compartments,
    each of said ion depleting subcompartments and said ion concentrating subcompartments containing a mixture of anion exchange resin and cation exchange resin,
    each of said ion depleting subcompartments and said ion concentrating subcompartments having a width defined by the distance between said ribs of between about 0.3 and 4 inches and a thickness between about 0.05 and 0.25 inches wherein the thickness of said subcompartments is defined by the distance between an anion permeable membrane adjacently positioned to a cation permeable membrane, said membranes being bonded to each of said ribs, along the length of said ribs and to said spacer,
    such that the anion permeable membrane and cation permeable membrane are positioned alternatively along the length of said dual compartment,
    means for passing a first liquid to be purified through said ion depleting compartment,
    and means for passing a second liquid for accepting ions from said first liquid through said ion concentrating compartment.

10. The construction of claim 9 wherein the width of said subcompartments is between about 0.5 and 1.5 inches.

11. The construction of claim 9 wherein the thickness of said subcompartments is between about 0.06 and 0.125 inches.

12. The construction of any one of claims 9, 10, or 11 wherein the ion exchange composition comprises a mixture of anionic exchange resin beads to cation cationic exchange resin beads and wherein the volume ration of anion exchange resin to cation exchange resin in said ion depleting compartments and in said ion concentrating compartments is between about 2.0 and 0.5.

13. The process for removing ions from a liquid in an apparatus comprising:
    a first cathode compartment at a first end of said apparatus,
    a first anode compartment at an end of said apparatus that is opposite of said first end,
    a plurality of dual compartments comprising an ion depleting compartment, an ion concentrating compartment and an odd number of at least three ion permeable membranes,
    said ion permeable membranes comprising anion permeable membranes alternately positioned with respect to cation permeable membranes,
    each of said ion depleting compartments and each of said ion concentrating compartments comprising a spacer and a plurality of ion depleting subcompartments and ion concentrating subcompartments,
    said subcompartments being formed by a plurality of ribs extending along the length of each of said ion depleting compartments and said ion concentrating compartments,
    each of said ion depleting subcompartments and said ion concentrating subcompartments containing a mixture of anion exchange resin and cation {an ion} exchange resin {composition},
    each of said ion depleting subcompartments and said ion concentrating subcompartments having a {rib} width defined by the distance between said ribs of between about 0.3 and 4 inches and a thickness between about 0.05 and 0.25 inches wherein the thickness of said subcompartments is defined by the distance between an anion permeable membrane adjacently positioned to {and} a cation permeable membrane, said membrane being bonded to each of said ribs, along the length of said ribs and to said spacer,
    {each of said ion permeable membranes being bonded to a spacer and said ribs within a spacer} such that the anion permeable membrane and cation permeable membrane are positioned alternatively along the length of said dual compartment, which comprises
    passing a first liquid to be purified through said ion depleting compartments,
    passing a second liquid for accepting ions from said first liquid through said ion concentrating compartments,
    supplying an electrical voltage between an anode in said anode compartment and a cathode within said cathode compartment,
    reversing polarity of said electrical voltage to convert said anode to a second cathode and to convert said cathode to a second anode and to convert said ion depleting compartments to second ion concentrating compartments and to convert said ion concentrating compartments to second ion depleting compartments and,
    recovering a liquid product having low conductivity continuously from said ion depleting compartments and said second ion depleting compartments.

14. The process of claim 13 wherein said plurality of dual compartments are separated from each other by a neutral zone and {means for} passing a third liquid through each of said neutral zones.

* * * * *